United States Patent
Xiao et al.

(10) Patent No.: US 6,291,087 B1
(45) Date of Patent: Sep. 18, 2001

(54) MAGNETORESISTIVE (MR) SENSOR ELEMENT WITH ENHANCED RESISTIVITY SENSITIVITY AND ENHANCED MAGNETIC EXCHANGE BIAS

(75) Inventors: Rongfu Xiao, Fremont; Chyu-Jiuh Torng, Pleasanton; Kochan Ju, Fremont; Cheng Horng, San Jose; Jei-Wei Chang, Cupertino, all of CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 09/336,786

(22) Filed: Jun. 21, 1999

(51) Int. Cl.$^7$ ..................................................... G11B 5/66
(52) U.S. Cl. ............ 428/692; 428/694 R; 428/694 TM; 428/694 TS; 428/900; 438/3; 438/48; 438/104; 438/381; 360/113; 148/108; 29/603.08; 29/603.14; 29/603.15
(58) Field of Search ............................. 360/113; 148/108; 438/3, 48, 104, 381; 428/692, 694 R, 694 TM, 694 TS, 900; 29/603.08, 603.14, 603.18

(56) References Cited

U.S. PATENT DOCUMENTS

| | | | |
|---|---|---|---|
| 5,309,305 | 5/1994 | Nepela et al. | 360/113 |
| 5,684,658 | * 11/1997 | Shi et al. | 360/113 |
| 5,783,460 | * 7/1998 | Han et al. | 438/3 |
| 5,859,753 | 1/1999 | Ohtsuka et al. | 360/113 |

* cited by examiner

*Primary Examiner*—Leszek Kiliman
(74) *Attorney, Agent, or Firm*—George O. Saile; Stephen B. Ackerman

(57) ABSTRACT

A method for forming a magnetoresistive (MR) sensor element, and a magnetoresistive sensor element fabricated in accord with the method. There is first provided a substrate. There is then formed over the substrate a magnetoresistive (MR) layer comprising: (1) a bulk layer of the magnetoresistive (MR) layer formed of a first magnetoresistive (MR) material optimized to provide an enhanced magnetoresistive (MR) resistivity sensitivity of the magnetoresistive (MR) layer; and (2) a surface layer of the magnetoresistive (MR) layer formed of a second magnetoresistive (MR) material optimized to provide an enhanced magnetic exchange bias when forming a magnetic exchange bias layer upon the surface layer of the magnetoresistive (MR) layer. Finally, there is then formed upon the surface layer of the magnetoresistive (MR) layer the magnetic exchange bias layer. The method contemplates an magnetoresistive (MR) sensor element fabricated in accord with the method. The method is particularly useful for forming a dual stripe magnetoresistive (DSMR) sensor element by employing a single magnetic exchange bias material with separate blocking temperatures.

15 Claims, 4 Drawing Sheets

MAGNETORESISTIVE (MR) SENSOR ELEMENT WITH ENHANCED RESISTIVITY SENSITIVITY AND ENHANCED MAGNETIC EXCHANGE BIAS

CROSS-REFERENCE TO RELATED APPLICATIONS

This application is related to co-assigned applications: (1) ser. No. 09/182,761, filed Oct. 30 1998, now U.S. Pat. No. 6,230,390, titled "Canted Longitudinal Patterned Exchange Biased Dual-Stripe Magnetoresistive (DSMR) Sensor Element and Method for Fabrication Thereof"; (2) Ser. No. 09/182,775, filed Oct. 30 1999, now pending titled "Anti-Parallel Longitudinal Patterned Exchange Biased Dual Stripe Magnetoresistive (DSMR) Sensor Element and Method for Fabrication Thereof"; and (3) Ser. No. 09/236,488, filed Jan. 25, 1999, now pending titled "Giant Magnetoresistive (GMR) Sensor Element With Enhanced Magnetoresistive (MR) Resistivity Sensitivity", the teachings and citations from all of which related co-assigned applications are incorporated herein fully by reference.

BACKGROUND OF THE INVENTION

1. Field of the Invention

The present invention relates generally to magnetoresistive (MR) sensor elements employed within magnetic data storage and retrieval. More particularly, the present invention relates to simultaneously providing: (1) enhanced magnetoresistive (MR) resistivity sensitivity; and (2) enhanced magnetic exchange bias, within magnetoresistive (MR) sensor elements employed within magnetic data storage and retrieval.

2. Description of the Related Art

The recent and continuing advances in computer and information technology have been made possible not only by the correlating advances in the functionality, reliability and speed of semiconductor integrated circuits, but also by the correlating advances in the storage density and reliability of direct access storage devices (DASDs) employed in digitally encoded magnetic data storage and retrieval.

Storage density of direct access storage devices (DASDs) is typically determined as areal storage density of a magnetic data storage medium formed upon a rotating magnetic data storage disk within a direct access storage device (DASD) magnetic data storage enclosure. The areal storage density of the magnetic data storage medium is defined largely by the track width, the track spacing and the linear magnetic domain density within the magnetic data storage medium. The track width, the track spacing and the linear magnetic domain density within the magnetic data storage medium are in turn determined by several principal factors, including but not limited to: (1) the magnetic read-write characteristics of a magnetic read-write head employed in reading and writing digitally encoded magnetic data from and into the magnetic data storage medium; (2) the magnetic domain characteristics of the magnetic data storage medium; and (3) the separation distance of the magnetic read-write head from the magnetic data storage medium.

With regard to the magnetic read-write characteristics of magnetic read-write heads employed in reading and writing digitally encoded magnetic data from and into a magnetic data storage medium, it is known in the art of magnetic read-write head fabrication that magnetoresistive (MR) sensor elements employed within magnetoresistive (MR) read-write heads are generally superior to other types of magnetic sensor elements when employed in retrieving digitally encoded magnetic data from a magnetic data storage medium. In that regard, magnetoresistive (MR) sensor elements are generally regarded as superior since magnetoresistive (MR) sensor elements are known in the art to provide high output digital read signal amplitudes, with good linear resolution, independent of the relative velocity of a magnetic data storage medium with respect to a magnetoresistive (MR) read-write head having the magnetoresistive (MR) sensor element incorporated therein.

Within the general category of magnetoresistive (MR) sensor elements, magnetically biased magnetoresistive (MR) sensor elements, such as longitudinal magnetic exchange biased magnetoresistive (MR) sensor elements, are even more desirable within the art of magnetoresistive (MR) sensor element fabrication insofar as magnetic biasing of a magnetoresistive (MR) layer within a magnetoresistive (MR) sensor element typically provides at least one of noise reduction and linear response enhancement within the magnetically biased magnetoresistive (MR) sensor element.

Similarly, as is also understood by a person skilled in the art, it is also desirable in the art of magnetoresistive (MR) sensor element fabrication to fabricate magnetoresistive (MR) sensor elements with enhanced magnetoresistive (MR) resistivity sensitivity. Within the context of the present invention, magnetoresistive (MR) resistivity sensitivity is intended as a measure of proportion of resistance change normalized to an absolute resistance of a magnetoresistive (MR) sensor element (i.e. dR/R) when measuring a magnetic signal within a magnetic data storage medium while employing the magnetoresistive (MR) sensor element. The magnetoresistive (MR) resistivity sensitivity of a magnetoresistive (MR) sensor element is alternatively known as the magnetoresistive (MR) coefficient of the magnetoresistive (MR) sensor element. Magnetoresistive (MR) sensor elements exhibiting enhanced magnetoresistive (MR) resistivity sensitivity are desirable within the art of magnetoresistive (MR) sensor element fabrication since such enhanced magnetoresistive (MR) resistivity sensitivity clearly inherently allows for detection within a magnetic data storage media of weaker magnetic signals with increased linear density and thus also inherently allows for an increased areal density of the magnetic data storage medium within a magnetic data storage enclosure which employs the magnetoresistive (MR) sensor element which exhibits the enhanced magnetoresistive (MR) resistivity sensitivity.

It is thus towards the goal of forming for use within magnetic data storage and retrieval magnetoresistive (MR) sensor elements simultaneously with enhanced magnetoresistive (MR) resistivity sensitivity and enhanced magnetic exchange bias that the present invention is directed.

Various magnetoresistive (MR) sensor elements which possess desirable properties, and/or methods for fabrication thereof, have been disclosed within the art of magnetoresistive (MR) sensor element fabrication.

For example, Nepela et al., in U.S. Pat. No. 5,309,305, discloses a dual stripe magnetoresistive (DSMR) sensor element with enhanced readout signal amplitude from the dual stripe magnetoresistive (DSMR) sensor element. The dual stipe magnetoresistive (DSMR) sensor element realizes the foregoing object by employing when forming the dual stripe magnetoresistive (MR) sensor element an antiferromagnetic magnetic exchange biasing of each patterned magnetoresistive (MR) layer within a pair of patterned magnetoresistive (MR) layers within the dual stripe magnetoresistive (MR) sensor element, and where the antiferromagnetic magnetic exchange biasing of each patterned magnetoresistive (MR) layer within the pair of patterned magnetoresistive (MR) layers is: (1) anti-parallel with respect to the other patterned magnetoresistive (MR) layer; and (2) perpendicular to the plane of a magnetic media layer from which magnetic data is read while employing the dual stripe magnetoresistive (DSMR) sensor element.

In addition, Shi et al., in U.S. Pat. No. 5,684,658, discloses a dual stripe magnetoresistive (DSMR) sensor element having a narrow read back width of the dual stripe magnetoresistive (DSMR) sensor element which in turn provides that the narrow read back width dual stripe magnetoresistive (DSMR) sensor element may be employed for reading digitally encoded magnetic data within narrowly spaced tracks within a magnetic data storage medium. The dual stripe magnetoresistive (DSMR) sensor element realizes the foregoing object by employing when forming the dual stripe magnetoresistive (DSMR) sensor element: (1) an offset of a first magnetoresistive (MR) layer with respect to a second magnetoresistive (MR) layer within the dual stripe magnetoresistive (DSMR) sensor element; (2) a parallel longitudinal magnetic biasing of the first magnetoresistive OR) layer and the second magnetoresistive (MR) layer within the dual stripe magnetoresistive (DSMR) sensor element; and (3) an anti-parallel electromagnetic biasing of the first magnetoresistive (MR) layer and the second magnetoresistive (MR) layer within the dual stripe magnetoresistive (DSMR) sensor element.

Further, Han et al., in U.S. Pat. No. 5,783,460, discloses a method for fabricating a dual stripe magnetoresistive (DSMR) sensor element, where there is minimized tolerance variations with respect to the width and/or alignment between a pair of magnetoresistive (MR) layers within the dual stripe magnetoresistive (DSMR) sensor element. To realize the foregoing object, the method employs a lift off stencil as an etch mask for forming from a trilayer stack layer comprising: (1) a blanket first magnetoresistive (MR) layer having formed thereupon; (2) a blanket inter-stripe dielectric layer, in turn having formed thereupon; (3) a blanket second magnetoresistive (MR) layer, a corresponding: (1) patterned first magnetoresistive (MR) layer having formed thereupon; (2) a patterned inter-stripe dielectric layer in turn having formed thereupon; (3) a patterned second magnetoresistive (MR) layer, wherein each of the three foregoing patterned layers has a series of fully aligned edges.

Finally, Ohtsuka et al., in U.S. Pat. No. 5,859,753, discloses a spin-valve magnetoresistive (SVMR) sensor element, and a method for fabricating the spin-valve magnetoresistive (SVMR) sensor element, where the spin-valve magnetoresistive (SVMR) sensor element has an attenuated susceptibility to thermal asperities and electrostatic discharge when employing the spin-valve magnetoresistive (SVMR ) sensor element for retrieving magnetic data from a magnetic data storage medium. The spin-valve magnetoresistive (SVMR) sensor element realizes the foregoing objects by employing a dual spin-valve magnetoresistive (DSVMR) sensor element fabrication where: (1) a pair of pinned magnetoresistive layers within the dual spin-valve magnetoresistive (DSVMR) sensor element is magnetically pinned in opposite directions; and (2) one conductor lead layer within each pair of conductor lead layers employed within the dual spin-valve magnetoresistive (DSVMR) sensor elements is positioned with respect to the magnetic data storage medium from which is retrieved magnetic data further removed than the other conductor lead layer within the pair of conductor lead layers.

Desirable in the art of magnetoresistive (MR) sensor element fabrication are additional methods and materials which may be employed for forming magnetoresistive (MR) sensor elements simultaneously with enhanced magnetoresistive (MR) resistivity sensitivity and with enhanced magnetic exchange bias.

It is towards the foregoing objects that the present invention is directed.

SUMMARY OF THE INVENTION

A first object of the present invention is to provide a magnetoresistive (MR) sensor element and a method for fabricating the magnetoresistive (MR) sensor element.

A second object of the present invention is to provide a magnetoresistive (MR) sensor element and a method for fabricating the magnetoresistive (MR) sensor element in accord with the first object of the present invention, where the magnetoresistive (MR) sensor element is fabricated simultaneously with enhanced magnetoresistive (MR) resistivity sensitivity and with enhanced magnetic exchange bias.

A third object of the present invention is to provide a method in accord with the first object of the present invention and the second object of the present invention, which method is readily commercially implemented.

In accord with the objects of the present invention, there is provided by the present invention a method for fabricating a magnetoresistive (MR) sensor element. To practice the method of the present invention, there is first provided a substrate. There is then formed over the substrate a magnetoresistive (MR) layer, where the magnetoresistive (MR) layer comprises: (1) a bulk layer of the magnetoresistive (MR) layer optimized to provide an enhanced magnetoresistive (MR) resistivity sensitivity of the magnetoresistive (MR) layer; and (2) a surface layer of the magnetoresistive (MR) layer optimized to provide an enhanced magnetic exchange bias when forming a magnetic exchange bias layer upon the surface layer of the magnetoresistive (MR) layer. Finally, there is then formed the magnetic exchange bias layer upon the surface layer of the magnetoresistive (MR) layer.

The method of the present invention contemplates a magnetoresistive (MR) sensor element fabricated in accord with the method of the present invention.

Advantageously, it has also been observed that by forming within the present invention the magnetoresistive (MR) layer with the surface layer of the magnetoresistive (MR) layer which provides the enhanced magnetic exchange bias of the magnetic exchange bias layer formed upon the surface layer of the magnetoresistive (MR) layer the magnetic exchange bias layer is formed with different blocking temperature characteristics in comparison with an otherwise equivalent magnetic exchange bias layer formed upon the bulk layer of the magnetoresistive (MR) layer absent the surface layer of the magnetoresistive (MR) layer which provides the enhanced magnetic exchange bias characteristics of the magnetic exchange bias layer formed upon the surface layer of the magnetoresistive (MR) layer. This advantage is desirable within the art of magnetoresistive (MR) sensor element fabrication insofar as it facilitates fabrication of a dual stripe magnetoresistive (DSMR) sensor element where each of two pair of patterned longitudinal magnetic exchange bias layers is formed of a single longitudinal magnetic exchange bias material, but nonetheless with a different blocking temperature from the other pair of patterned longitudinal magnetic exchange bias layers.

The present invention provides a method for fabricating a magnetoresistive (MR) sensor element simultaneously with enhanced magnetoresistive (MR) resistivity sensitivity and with enhanced magnetic exchange bias. The present invention realizes the foregoing objects by employing when fabricating the magnetoresistive (MR) sensor element a magnetoresistive (MR) layer comprising: (1) a bulk layer of the magnetoresistive (MR) layer optimized to provide an enhanced magnetoresistive (MR) resistivity sensitivity of the magnetoresistive (MR) layer; and (2) a surface layer of the magnetoresistive (MR) layer optimized to provide an enhanced magnetic exchange bias when forming a magnetic exchange bias layer upon the surface layer of the magnetoresistive (MR) layer.

The present invention is readily commercially implemented. As is disclosed within the Description of the Preferred Embodiments which follows, the present invention employs methods and materials as are otherwise generally known in the art of magnetoresistive (MR) sensor element fabrication. Since it is a specific process ordering and materials selection which at least in part provides the present invention, rather than the existence of methods and materials which provides the present invention, the method of the present invention is readily commercially implemented.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENTS

The present invention provides a method for formning a magnetoresistive (MR) sensor element simultaneously with enhanced magnetoresistive (MR) resistivity sensitivity and with enhanced magnetic exchange bias. The present invention realizes the foregoing objects by employing when forming the magnetoresistive (MR) sensor element a magnetoresistive (MR) layer comprising: (1) a bulk layer of the magnetoresistive (MR) layer optimized to provide an enhanced magnetoresistive (MR) resistivity sensitivity of the magnetoresistive (MR) layer; and (2) a surface layer of the magnetoresistive (MR) layer optimized to provide an enhanced magnetic exchange bias when forming a magnetic exchange bias layer upon the surface layer of the magnetoresistive (MR) layer.

As is shown in part within the Description of the Preferred Embodiments which follows, the present invention may be employed in forming magnetoresistive (MR) sensor elements including but not limited to single stripe magnetoresistive (SSMR) sensor elements and dual stripe magnetoresistive (DSMR) sensor elements, either of which may be formed within magnetic heads including but not limited to magnetoresistive (MR) read only heads and magnetoresistive (MR) read-write heads when at least retrieving magnetic data including but not limited to digital magnetic data and analog magnetic data within magnetic data storage enclosures including but not limited to linear access storage device magnetic data storage enclosures and direct access storage device (DASD) magnetic data storage enclosures.

First Preferred Embodiment

Figure 1:
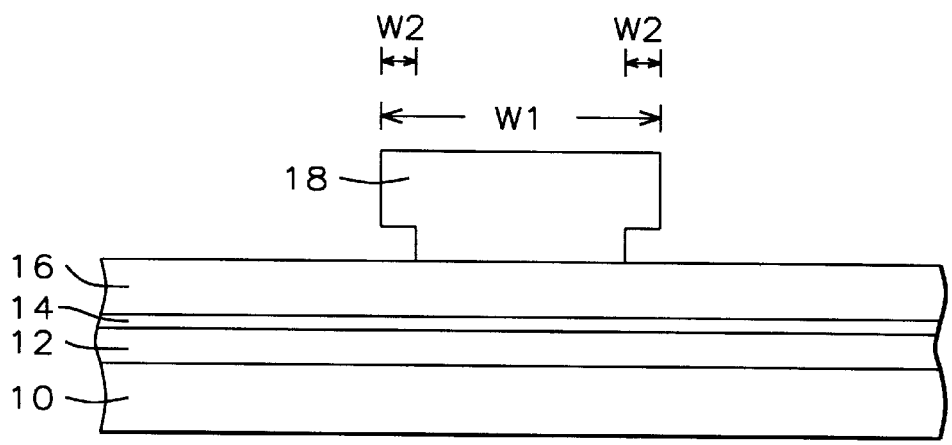
FIG. 1, FIG. 2, FIG. 3 and FIG. 4 show a series of schematic cross-sectional diagrams illustrating the results of progressive stages in forming in accord with a general embodiment of the present invention which comprises a first preferred embodiment of the present invention a single stripe magnetoresistive (SSMR) sensor element in accord with the present invention.

Referring now to FIG. 1 to FIG. 4, there is shown a series of schematic cross-sectional diagrams illustrating the results of progressive stages in forming in accord with a general embodiment of the present invention which comprises a first preferred embodiment of the present invention a single stripe magnetoresistive (SSMR) sensor element in accord with the present invention. Shown in FIG. 1 is a schematic cross-sectional diagram of the single stripe magnetoresistive (SSMR) sensor element at an early stage in its fabrication in accord with the first preferred embodiment of the present invention.

Shown in FIG. 1 is a substrate 10 having formed thereupon a series of three layers consisting of. (1) a blanket first dielectric layer 12 formed upon the substrate 10; (2) a patterned first seed layer 14 formed upon the blanket first dielectric layer 12; and (3) a patterned first magnetoresistive (MR) layer 16 formed upon the patterned first seed layer 14. Similarly, there is also shown within FIG. 1 formed upon the patterned first magnetoresistive (MR) layer 16 a lift off stencil 18. Although there is illustrated within FIG. 1 the blanket first dielectric layer 12, the patterned first seed layer 12 and the patterned first magnetoresistive (MR) layer 16 each with equivalent indeterminate lateral dimensions, it is intended within the first preferred embodiment of the present invention that the blanket first dielectric layer 12 extends laterally further in both lateral directions in comparison with the patterned first seed layer 14 and the patterned first magnetoresistive (MR) layer 16.

Within the first preferred embodiment of the present invention, each of the foregoing three layers, as well as the lift off stencil 18, may be formed employing methods and materials as are otherwise conventional in the art of magnetic read-write head fabrication, including magnetoresistive (MR) sensor element fabrication.

For example, although it is known in the art of magnetic read-write head fabrication, including magnetoresistive (MR) sensor element fabrication, that substrates are typically and preferably formed of non-magnetic ceramic materials such as but not limited to oxides, nitrides, carbides and borides, as well as homogeneous or heterogeneous composites thereof, for the first preferred embodiment of the present invention the substrate 10 is typically and preferably formed of a non-magnetic alumina-titanium carbide ceramic material. Typically and preferably, the substrate 10 is formed of dimensions sufficient such that the substrate 10 may be formed into a slider employed within a direct access storage device (DASD) magnetic data storage enclosure employed within digitally encoded magnetic data storage and retrieval, although, as noted above, a magnetoresistive (MR) sensor element fabricated in accord with the present invention may be employed when retrieving magnetic data including but not limited to analog encoded magnetic data and digitally encoded magnetic data from magnetic data storage enclosures including but not limited to linear access storage device magnetic data storage enclosures and direct access storage device (DASD) magnetic data storage enclosures.

In addition, although it is also known in the art of magnetic read-write head fabrication, including magnetoresistive (MR) sensor element fabrication, that dielectric layers may be formed of dielectric materials including but not limited to silicon oxide dielectric materials, silicon nitride dielectric materials and aluminum oxide dielectric materials, formed employing methods including but not limited to chemical vapor deposition (CVD) methods, plasma enhanced chemical vapor deposition (PECVD) methods and physical vapor deposition (PVD) methods, for the first preferred embodiment of the present invention, the blanket first dielectric layer 12 is typically and preferably formed of an aluminum oxide dielectric material formed upon or over the substrate 10 to a thickness of from about 300 to about 1000 angstroms.

Similarly, within the first preferred embodiment of the present invention with respect to the patterned first seed layer 14, the patterned first seed layer 14 is formed of a seed material which enhances a magnetoresistive (MR) resistivity sensitivity of the patterned first magnetoresistive (MR) layer 16 when formed upon the patterned first seed layer 14. Such materials have been disclosed in the art of magnetoresistive (MR) sensor element fabrication in conjunction with the above cross-references to the related co-assigned applications to which the present application is related. Within the first preferred embodiment of the present invention when the patterned magnetoresistive layer 16 is formed of a nickel-iron (80:20; w/w) permalloy alloy magnetoresistive (MR) material or a closely related magnetoresistive (MR) material, the patterned first seed layer 14 is typically and preferably formed of a nickel-chromium alloy seed material or a nickel-iron-chromium alloy seed material formed upon the blanket dielectric layer 12 to a thickness of from about 30 to about 60 angstroms. As is similarly also disclosed within an above cross-reference to a related application to which the present application is related, the nickel-chromium alloy seed material will typically and preferably have a nickel:chromium weight ratio of from about 65:35 to about 55:45 while the nickel-iron-chromium alloy seed material will typically and preferably have a nickel:chromium:iron weight ratio of from about 56:14:30 to about 40:10:50 (more preferably from about 52:13:35 to about 44:11:45).

Within the first preferred embodiment of the present invention with respect to the patterned magnetoresistive (MR) layer 16, the patterned magnetoresistive (MR) layer 16, as suggested above, is typically and preferably formed of a nickel-iron (80:20; w/w) permalloy alloy, although within the context of the present invention other magnetoresistive (MR) materials may also be employed, such as other magnetoresistive (MR) materials derived from higher order alloys incorporating permalloy alloys, as well as other magnetoresistive (MR) materials derived from magnetoresistive (MR) nickel materials, magnetoresistive (MR) iron materials, magnetoresistive (MR) cobalt materials, alloys thereof, and laminates thereof, providing that there is selected an appropriate seed material for the patterned first seed layer 14 such that the patterned first magnetoresistive (MR) layer 16 is formed with enhanced magnetoresistive (MR) resistivity sensitivity when formed upon the patterned first seed layer 14. Typically and preferably, the patterned first magnetoresistive (MR) layer 16 is formed to a thickness of from about 50 to about 150 angstroms, a length of from about 0.5 to about 2.0 microns and a width of from about 0.3 to about 1.2 microns, where, although not specifically illustrated within the schematic cross-sectional diagram of FIG. 1, the length and width of the patterned first magnetoresistive (MR) layer 16 are typically and preferably co-extensive with the patterned first seed layer 14.

Finally, within the first preferred embodiment of the present invention with respect to the lift off stencil 18, although it is known in the art of magnetic read-write head fabrication, including magnetoresistive (MR) sensor element fabrication, that lift off stencils may be formed employing materials including but not limited to organic polymer materials, photoresist materials and aggregates thereof, for the first preferred embodiment of the present invention, the lift off stencil 18 is typically and preferably formed employing a organic polymer soluble under layer upon which there is formed uniformly overhanging a patterned photoresist layer. As is illustrated within the schematic cross-sectional diagram of FIG. 1, the patterned photoresist layer will typically and preferably have a linewidth W1 of from about 0.5 to about 1.5 microns while simultaneously overhanging the patterned soluble underlayer by an overhang width W2 of from about 0.1 to about 0.3 microns.

Figure 2:
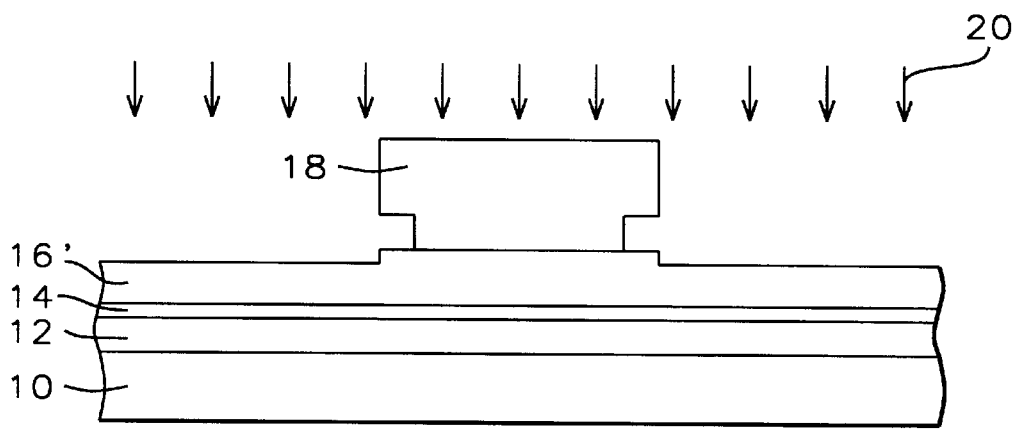

Referring now to FIG. 2, there is shown a schematic cross-sectional diagram illustrating the results of further processing of the single stripe magnetoresistive (SSMR) sensor element whose schematic cross-sectional diagram is illustrated in FIG. 1.

Shown in FIG. 2 is a schematic cross-sectional diagram of a single stripe magnetoresistive (SSMR) sensor element otherwise equivalent to the single stripe magnetoresistive (SSMR) sensor element whose schematic cross-sectional diagram is illustrated in FIG. 1, but wherein the patterned first magnetoresistive (MR) layer 16 has been etched to form an etched patterned first magnetoresistive (MR) layer 16' while employing the lift off stencil 18 as a mask, in conjunction with use of an anisotropic etchant 20. Within the first preferred embodiment of the present invention with respect to the anisotropic etchant 20, the anisotropic etchant 20 is typically and preferably ion beam etchant, either a reactive ion beam etchant or a non-reactive ion beam etchant, as may otherwise be conventional in the art of magnetoresistive (MR) sensor element fabrication. More typically and preferably, the anisotropic etchant 20 is an argon nonreactive ion beam anisotropic etchant.

When etching the patterned first magnetoresistive (MR) layer 16 to form the etched patterned first magnetoresistive (MR) layer 16' over a four inch by four inch square substrate 10, the argon non-reactive ion beam anisotropic etchant 20 also preferably employs: (1) a reactor chamber pressure of from about 5 to about 10 mtorr; (2) an ion beam power of from about 200 to about 1000 watts; and (3) an argon flow rate of from about 30 to about 100 standard cubic centimeters per minute (sccm). Typically and preferably, the anisotropic etchant 20 is employed to etch to a depth of from about 30 to about 80 angstroms into the patterned first magnetoresistive (MR) layer 16 when forming therefrom the etched patterned first magnetoresistive (MR) layer 16'.

Figure 3:
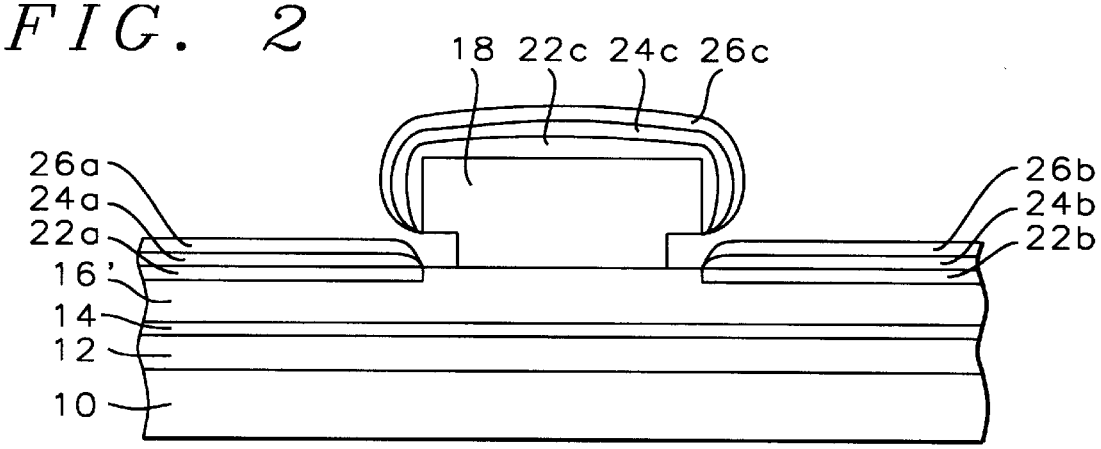

Referring now to FIG. 3, there is shown a schematic cross-sectional diagram illustrating the results of further processing of the single stripe magnetoresistive (SSMR) sensor element whose schematic cross-sectional diagram is illustrated in FIG. 2.

Shown in FIG. 3 is a schematic cross-sectional diagram of a single stripe magnetoresistive (SSMR) sensor element otherwise equivalent to the single stripe magnetoresistive (SSMR) sensor element whose schematic cross-sectional diagram is illustrated in FIG. 2, but wherein there is formed into a pair of recesses within the etched patterned first magnetoresistive (MR) layer 16': (1) a pair of patterned first magnetoresistive (MR) filler layers 22a and 22b having formed and aligned thereupon; (2) a pair of patterned first magnetic exchange bias layers 24a and 24b in turn having formed and aligned thereupon; (3) a pair of patterned first conductor lead layers 26a and 26b. Similarly, there is also shown within FIG. 3 formed upon the lift off stencil 18: (1) a corresponding first magnetoresistive (NM) filler layer residue 22c having formed thereupon; (2) a corresponding first magnetic exchange bias layer residue 24c in turn having formed thereupon; (3) a corresponding first conductor lead layer residue 26c.

Within the first preferred embodiment of the present invention with respect to the patterned first magnetoresistive (MR) filler layers 22a and 22b and the first magnetoresistive (MR) filler layer residue 22c, the pair of patterned first magnetoresistive (MR) filler layers 22a and 22b and the first magnetoresistive (MR) filler layer residue 22c may be formed of any magnetoresistive (MR) material which provides an enhanced magnetic exchange bias for the patterned first magnetic exchange bias layers 24a and 24b which are formed upon the patterned first magnetoresistive (MR) filler layers 22a and 22b. While the patterned first magnetoresistive (MR) filler layers 22a and 22b may thus be formed of either the same magnetoresistive (MR) material as is employed when forming the patterned first magnetoresistive (MR) layer 16 or a different magnetoresistive (MR) material as is employed for forming the patterned first magnetoresistive (MR) layer 16, it is nonetheless typical and preferred that there is employed the same nickel-iron (80:20; w/w) permalloy alloy magnetoresistive (MR) material for forming the patterned first magnetoresistive (MR) filler layers 22a and 22b.

In order to provide the enhanced magnetic exchange bias when forming the pair of patterned first magnetoresistive (MR) filler layers 22a and 22b, when the pair of patterned first magnetoresistive (MR) filler layers 22a and 22b is formed of the same magnetoresistive (MR) material as the etched patterned first magnetoresistive (MR) layer 16', it has been found experimentally that the pair of patterned first magnetoresistive (MR) filler layers 22a and 22b is preferably formed in a fashion such that the pair of patterned first magnetoresistive (MR) filler layers 22a and 22b is formed with a crystal structure different from the crystal structure employed for forming the etched patterned first magnetoresistive (MR) layer 16'. Similarly, within the first preferred embodiment of the present invention when the etched patterned first magnetoresistive (MR) layer 16' and the pair of patterned first magnetoresistive (MR) filler layers 22a and 22b are formed of the nickel-iron (80:20; w/w) permalloy alloy magnetoresistive (MR) material, it has been determined experimentally through use of x-ray diffraction methods that: (1) the etched patterned first magnetoresistive (MR) layer 16' is typically and preferably formed as a substantially monocrystalline, preferably although not necessarily exclusively a nearly (111) textured, nickel-iron (80:20; w/w) permalloy alloy magnetoresistive (MR) material incident to being formed upon the seed layer which provides the patterned first magnetoresistive (MR) layer 16 with the enhanced magnetoresistive (MR) resistivity sensitivity; and (2) the pair of patterned first magnetoresistive (MR) filler layers 22a and 22b is typically and preferably formed of a substantially polycrystalline nickel-iron (80:20; w/w) permalloy alloy magnetoresistive (MR) material. Typically and preferably, the pair of patterned first magnetoresistive (MR) filler layers 22a and 22b is formed to a thickness of from about 40 to about 100 angstroms upon the etched patterned first magnetoresistive (MR) layer 16'.

Within the context of the present invention, "substantially monocrystalline" and "nearly (111) textured" are intended as a crystallinity of greater than about 75 percent as determined employing an x-ray crystallographic technique, while "substantially polycrystalline" is intended as a monocrystallinity of less than about 25 percent as determined employing the x-ray crystallographic technique.

Similarly, within the first preferred embodiment of the present invention when forming the pair of patterned first magnetoresistive (MR) filler layers 22a and 22b formed of the same nickel-iron (80:20; w/w) permalloy alloy magnetoresistive (MR) material as the etched patterned first magnetoresistive (MR) layer 16', there may be employed in order to effect the difference in crystal structure between the pair of patterned first magnetoresistive filler layers 22a and 22b and the etched patterned first magnetoresistive (MR) layer 16' modification of any of several parameters directed towards etching of the patterned first magnetoresistive layer 16 when forming the etched patterned first magnetoresistive layer 16', such parameters including but not limited to: (1) an increase in sputtering rate; (2) an increase in sputtering pressure; or (3) an addition of a co-sputtering dopant gas such as oxygen or nitrogen, where any of the above might provide a roughened surface of the etched patterned first magnetoresistive (MR) layer 16' or a secondary deposit of the magnetoresistive (MR) material from which is formed the etched patterned first magnetoresistive (MR) layer 16'. Similarly, it is also feasible within the present invention to employ when forming the patterned first magnetoresistive (MR) filler layers 22a and 22b a magnetoresistive (MR) material other than the magnetoresistive (MR) material which is employed for forming the etched patterned first magnetoresistive (MR) layer 16'. Examples of such magnetoresistive (MR) materials are described above within the context of materials from which the patterned first magnetoresistive (MR) layer 16 may alternatively be formed.

Within the first preferred embodiment of the present invention with respect to the pair of patterned first magnetic exchange bias layers 24a and 24b and the first magnetic exchange bias layer residue 24c, each of the pair of patterned first magnetic exchange bias layers 24a and 24b and the first magnetic exchange bias layer residue 24c may be formed employing exchange bias materials as are conventional in the art of microelectronic fabrication, where the exchange bias materials are intended to typically include antiferromagnetic exchange bias materials, such as but not limited to iron-manganese alloy anti-ferromagnetic exchange bias materials, nickel-manganese alloy anti-ferromagnetic exchange bias materials, iridium-manganese alloy anti-ferromagnetic exchange bias materials, and platinum-manganese alloy anti-ferromagnetic exchange bias materials, as well as certain higher order anti-ferromagnetic alloy exchange bias materials, such as platinum-palladium-manganese alloys, nickel-chromium-manganese alloys, ruthenium-rhodium-manganese alloys and platinum-chromium-manganese alloys. Typically and preferably, the pair of patterned first magnetic exchange bias layers 24a and 24b, and the first magnetic exchange bias layer residue 24c, are formed to a thickness of from about 70 to about 300 angstroms.

Finally, within the first preferred embodiment of the present invention with respect to the pair of patterned first conductor lead layers 26a and 26b and the first conductor lead layer residue 26c, the pair of patterned first conductor lead layers 26a and 26b and the first conductor lead layer residue 26c are typically and preferably formed of conductor lead materials as are conventional in the art of magnetoresistive (MR) sensor element fabrication, including but not limited to gold, gold alloy, silver, silver alloy, copper, copper alloy, tantalum and tantalum alloy conductor lead materials, as well as composites thereof. Typically and preferably, each of the pair of patterned first conductor lead layers 26a and 26b and the first conductor lead layer residue 26c is formed to a thickness of from about 300 to about 1000 angstroms.

Figure 4:
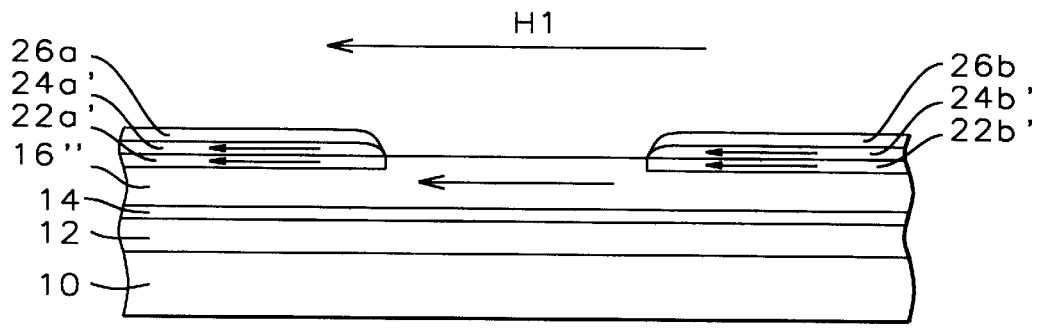

Referring now to FIG. 4, there is shown a schematic cross-sectional diagram illustrating the results of further processing of the single stripe magnetoresistive (SSMR) sensor element whose schematic cross-sectional diagram is illustrated in FIG. 3.

Shown in FIG. 4, is a schematic cross-sectional diagram of a single stripe magnetoresistive (SSMR) sensor element otherwise equivalent to the single stripe magnetoresistive (SSMR) sensor element whose schematic cross-sectional diagram is illustrated in FIG. 3, but wherein, in a first instance, there has been stripped from the single stripe magnetoresistive (SSMR) sensor element the lift off stencil 18 while taking with it the first magnetoresistive (MR) filler layer residue 22c, the first magnetic exchange bias layer residue 24c and the first conductor lead layer residue 26c. The lift off stencil 18 may be stripped from the single stripe magnetoresistive (SSMR) sensor element whose schematic cross-sectional diagram is illustrated in FIG. 3 to provide in part the single stripe magnetoresistive (SSMR) sensor element whose schematic cross-sectional diagram is illustrated in FIG. 4 while employing methods as are conventional in the art of magnetoresistive (MR) sensor element fabrication, such methods typically including, but not limited to, wet chemical stripping methods.

There is also shown within the schematic cross-sectional diagram of FIG. 4 the presence of a first extrinsic magnetic bias field H1 which is employed in conjunction with a first thermal annealing of the single stripe magnetoresistive (SSMR) sensor element whose schematic cross-sectional diagram is illustrated in FIG. 4 to provide from: (1) the pair of patterned first magnetic exchange bias layers 24a and 24b a corresponding pair of magnetically biased patterned first magnetic exchange bias layers 24a' and 24b'; (2) the pair of patterned first magnetoresistive (MR) filler layers 22a and 22b a corresponding pair of magnetically biased patterned first magnetoresistive (MR) filler layers 22a' and 22b'; and (3) the etched patterned first magnetoresistive (MR) layer 16' a corresponding magnetically biased etched patterned first magnetoresistive (MR) layer 16".

Within the first preferred embodiment of the present invention when forming from: (1) the pair of patterned first magnetic exchange bias layers 24a and 24b the corresponding pair of magnetically biased patterned first magnetic exchange bias layers 24a' and 24b'; (2) the pair of patterned first magnetoresistive (MR) filler layers 22a and 22b the pair of magnetically biased patterned first magnetoresistive (MR) filler layers 22a' and 22b'; and (3) the etched patterned first magnetoresistive (MR) layer 16 the magnetically biased etched patterned first magnetoresistive (MR) layer 16", there is typically and preferably employed the first extrinsic magnetic field H1 of strength from about 1000 to about 2000 oersteds, a thermal annealing temperature of from about 250 to about 280 degrees centigrade and a thermal annealing exposure time of from about 2 to about 10 hours.

Upon forming the single stripe magnetoresistive (SSMR) sensor element whose schematic cross-sectional diagram is illustrated in FIG. 4, there is formed a single stripe magnetoresistive (SSMR) sensor element simultaneously with an enhanced magnetoresistive (MR) resistive sensitivity and with an enhanced magnetic exchange bias. The present invention realizes the foregoing objects by employing when forming the single stripe magnetoresistive (SSMR) sensor element a magnetoresistive (MR) layer comprising: (1) a bulk layer of the magnetoresistive (MR) layer optimized to provide an enhanced magnetoresistive (MR) resistivity sensitivity of the magnetoresistive (MR) layer; and (2) a surface layer of the magnetoresistive (MR) layer optimized to provide an enhanced magnetic exchange bias of a magnetic exchange bias layer when formed upon the surface layer of the magnetoresistive (MR) layer.

The single stripe magnetoresistive (SSMR) sensor element whose schematic cross-sectional diagram is illustrated in FIG. 4 may be further fabricated to form a single stripe magnetoresistive (SSMR) head through use of methods and materials as are conventional in the art of magnetoresistive (MR) head fabrication. Incident to forming such a single stripe magnetoresistive (MR) head, there will typically and preferably be formed while employing the single stripe magnetoresistive (SSMR) sensor element whose schematic cross-sectional diagram is illustrated in FIG. 4 magnetic shield layers, magnetic pole layers, soft adjacent layers, hard bias layers, passivation layers and conductor interconnect layers as are conventional in the art of magnetoresistive (MR) head fabrication.

Second Preferred Embodiment

Figure 5:
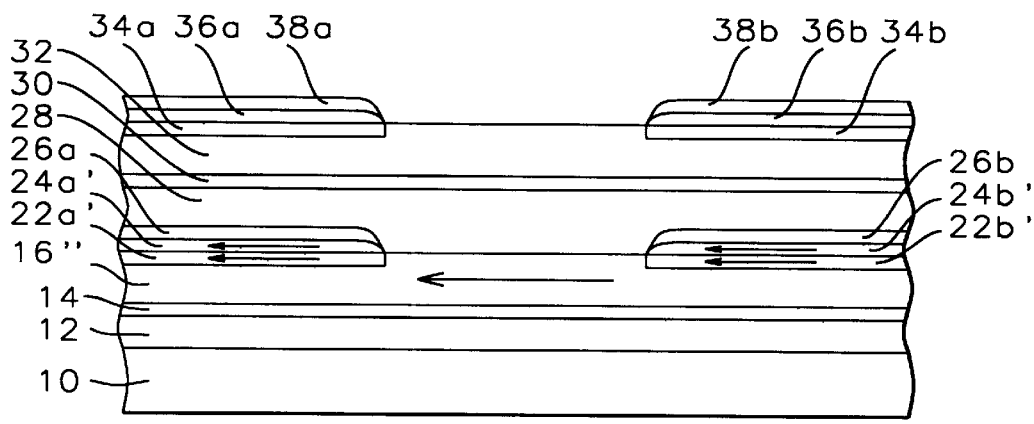
FIG. 5 and FIG. 6 shown a pair of schematic cross-sectional diagrams illustrating the results of forming in accord with a more specific embodiment of the present invention which comprises a second preferred embodiment of the present invention a dual stripe magnetoresistive (DSMR) sensor element in accord with the present invention, incident to further processing of the single stripe magnetoresistive (SSMR) sensor element whose schematic cross-sectional diagrams are illustrated within FIG. 1 to FIG. 4.
Figure 6:
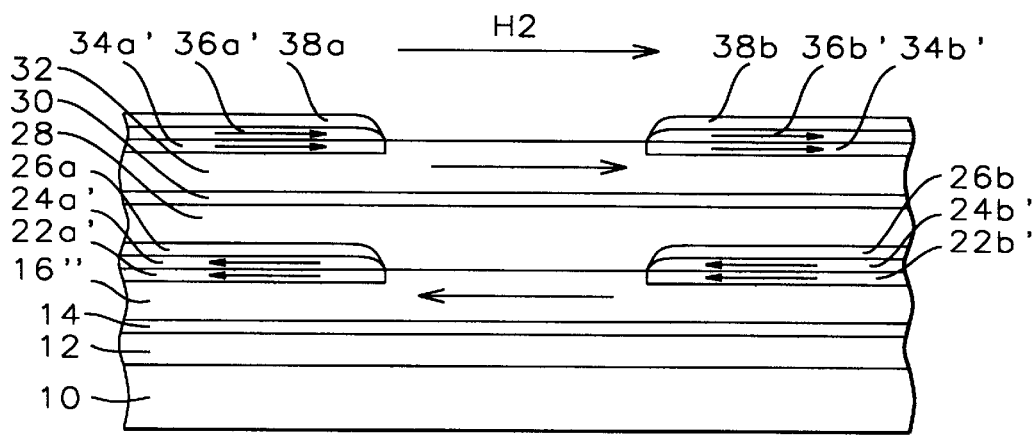

Referring now to FIG. 5 and FIG. 6, there is shown a pair of schematic cross-sectional diagrams illustrating the results of further fabrication of the single stripe magnetoresistive (SSMR) sensor element whose schematic cross-sectional diagram is illustrated in FIG. 4 to provide therefrom a dual stripe magnetoresistive (DSMR) sensor element in accord with a second preferred embodiment of the present invention. Shown in FIG. 5 is a schematic cross-sectional diagram illustrating the results of early stages of fabrication of the single stripe magnetoresistive (SSMR) sensor element whose schematic cross-sectional diagram is illustrated in FIG. 4 to provide the dual stripe magnetoresistive (DSMR) sensor element in accord with the second preferred embodiment of the present invention.

Shown in FIG. 5 is a schematic cross-sectional diagram of a single stripe magnetoresistive (SSMR) sensor element otherwise equivalent to the single stripe magnetoresistive (SSMR) sensor element whose schematic cross-sectional diagram is illustrated in FIG. 4, but wherein, in a first instance, there is formed upon the pair of patterned first conductor lead layers 26a and 26b and exposed portions of the magnetically biased etched patterned first magnetoresistive (MR) layer 16" a blanket second dielectric layer 28. Within the second preferred embodiment of the present invention, the blanket second dielectric layer 28 is typically and preferably formed employing methods and materials analogous or equivalent to the methods and materials employed for forming the blanket first dielectric layer 12. Typically and preferably, the blanket second dielectric layer 28 is formed of an aluminum oxide dielectric material formed to a thickness of from about 200 to about 400 angstroms upon exposed portions of the pair of patterned first conductor lead layers 26a and 26b and the magnetically biased etched patterned first magnetoresistive (MR) layer 16".

Similarly, in a second instance, there is also shown within the schematic cross-sectional diagram of FIG. 5 formed upon the blanket second dielectric layer 28 a patterned second seed layer 30, and there is also shown formed upon the patterned second seed layer 30 an etched patterned second magnetoresistive (MR) layer 32. Within the second preferred embodiment of the present invention, the patterned second seed layer 30 is typically and preferably formed employing methods, materials and thickness dimensions analogous or equivalent to the methods, materials and thickness dimensions employed for forming the patterned first seed layer 14. Similarly, within the second preferred embodiment of the present invention, the etched patterned second magnetoresistive (MR) layer 32 is typically and preferably formed employing methods, materials and thickness dimensions analogous or equivalent to the methods, materials and thickness dimensions employed for forming the etched patterned first magnetoresistive (MR) layer 16'.

Finally, there is shown within the schematic cross-sectional diagram of FIG. 5 formed into a pair of recesses formed within the etched patterned second magnetoresistive (MR) layer 32: (1) a pair of patterned second magnetoresistive (MR) filler layers 34a and 34b having formed and aligned thereupon; (2) a pair of patterned second magnetic exchange bias layers 36a and 36b in turn having formed and aligned thereupon; (3) a pair of patterned second conductor lead layers 38a and 38b. Within the second preferred embodiment of the present invention, the pair of patterned second magnetoresistive (MR) filler layers 34a and 34b is typically and preferably formed employing methods, materials and thickness dimensions analogous or equivalent to the methods, materials and thickness dimensions employed for forming the pair of patterned first magnetoresistive (MR) filler layers 22a and 22b. Similarly, the pair of patterned second magnetic exchange bias layers 36a and 36b is typically and preferably formed employing methods, materials and thickness dimensions analogous or equivalent to the methods, materials and thickness dimension employed for forming the pair of patterned first magnetic exchange bias layers 24a and 24b. Finally, within the second preferred embodiment the pair of patterned second conductor lead layers 38a and 38b is typically and preferably formed employing methods, materials and thickness dimensions analogous or equivalent to the methods, materials and thickness dimensions employed for forming the pair of patterned first conductor lead layers 26a and 26b.

Referring now to FIG. 6, there is shown a schematic cross-sectional diagram illustrating the results of further processing of the dual stripe magnetoresistive (DSMR) sensor element whose schematic cross-sectional diagram is illustrated in FIG. 5.

Shown in FIG. 6 is a schematic cross-sectional diagram of a dual stripe magnetoresistive (DSMR) sensor element otherwise equivalent to the dual stripe magnetoresistive (DSMR) sensor element whose schematic cross-sectional diagram is illustrated in FIG. 5, but wherein: (1) the etched patterned second magnetoresistive (MR) layer 32 is magnetically biased to form a magnetically biased etched patterned second magnetoresistive (MR) layer 32'; (2) the pair of patterned second magnetoresistive (MR) filler layers 34a and 34b is magnetically biased to form a pair of magnetically biased patterned second magnetoresistive (MR) filler layers 34a' and 34b'; and (3) the pair of patterned second magnetic exchange bias layers 36a and 36b is magnetically biased to form a pair of magnetically biased patterned second magnetic exchange bias layers 36a' and 36b', through annealing within a second extrinsic magnetic field H2 in a direction counter-opposed to the direction of the magnetically biased etched patterned first magnetoresistive (MR) layer 16", the magnetically biased patterned first magnetoresistive filler layers 22a' and 22b' and the magnetically biased patterned first magnetic exchange bias layers 24a' and 24b'. There is thus formed as illustrated within the schematic cross-sectional diagram of FIG. 6 an anti-parallel exchange biased dual stripe magnetoresistive (APEX-DSMR) magnetoresistive (MR) sensor element.

When forming the anti-parallel exchange biased dual stripe magnetoresistive (APEX-DSMR) sensor element whose schematic cross-sectional diagram is illustrated in FIG. 6 from the dual stripe magnetoresistive (DSMR) sensor element whose schematic cross-sectional diagram is illustrated in FIG. 5, the dual stripe magnetoresistive (DSMR) sensor element whose schematic cross-sectional diagram is illustrated in FIG. 5 is typically and preferably annealed thermally within the second extrinsic magnetic bias field H2 of strength from about 200 to about 260 oersteds at a temperature of from about 240 to about 260 degrees centigrade for a time period of from about 0.5 to about 5 hours.

As is understood by a person skilled in the art, when forming the anti-parallel exchange biased dual stripe magnetoresistive (APEX-DSMR) sensor element whose schematic cross-sectional diagram is illustrated in FIG. 6 from the dual stripe magnetoresistive (DSMR) sensor element whose schematic cross-sectional diagram is illustrated in FIG. 5, in order to provide the anti-parallel exchange (APEX) biasing, it will generally be required that the patterned second magnetic exchange bias layers 36a and 36b be formed of a second anti-ferromagnetic exchange bias material which is different from a first anti-ferromagnetic exchange bias material which is employed for forming the pair of patterned first magnetic exchange bias layers 24a and 24b. Similarly, it is desired that the first anti-ferromagnetic exchange bias material has an inherently higher blocking temperature than the second anti-ferromagnetic exchange bias material.

As an alternative, magnetic biasing methods as disclosed within the cross-references to the related applications may also be employed within the present invention when the first anti-ferromagnetic exchange bias material and the second anti-ferromagnetic exchange bias material are equivalent.

Upon forming the anti-parallel exchange biased dual stripe magnetoresistive (APEX-DSMR) sensor element whose schematic cross-sectional diagram is illustrated in FIG. 6, there is formed an anti-parallel exchange biased dual stripe magnetoresistive (APEX-DSMR) sensor element simultaneously with enhanced magnetoresistive (MR) resistivity sensitivity and with enhanced magnetic exchange bias. The anti-parallel exchange biased dual stripe magnetoresistive (APEX-DSMR) sensor element realizes the foregoing objects by employing when forming the anti-parallel exchange biased dual stripe magnetoresistive (APEX-DSMR) sensor element a pair of patterned magnetoresistive (MR) layers wherein each patterned magnetoresistive (MR) layer within the pair of patterned magnetoresistive (MR) layers comprises: (1) a bulk layer of the magnetoresistive (MR) layer optimized to provide an enhanced magnetoresistive (MR) resistivity sensitivity of the magnetoresistive (MR) layer and; (2) a surface layer of the magnetoresistive (MR) layer optimized to provide an enhanced magnetic exchange bias of a magnetic exchange bias layer formed upon the surface layer of the magnetoresistive (MR) layer.
Third Preferred Embodiment Referring now to FIG. 7, there is shown a schematic cross-sectional diagram illustrating an alternative anti-parallel exchange biased dual stripe magnetoresistive (APEX-DSMR) sensor element fabricated in accord with a third preferred embodiment of the present invention.

Figure 7:
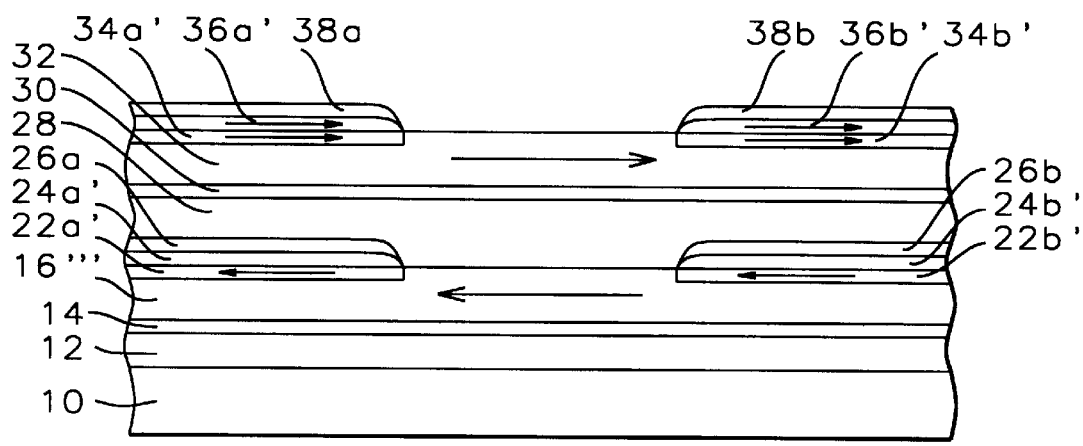
FIG. 7 shows a schematic cross-sectional diagram illustrating the results of forming in accord with a more specific embodiment of the present invention which comprises a third preferred embodiment of the present invention an alternative dual stripe magnetoresistive (DSMR) sensor element in accord with the present invention.

Illustrated within the schematic cross-sectional diagram of FIG. 7 is a schematic cross-sectional diagram of a anti-parallel exchange biased dual stripe magnetoresistive (APEX-DSMR) sensor element otherwise equivalent to the anti-parallel exchange biased dual stripe magnetoresistive (APEX-DSMR) sensor element whose schematic cross-sectional diagram is illustrated in FIG. 6, but wherein there is employed a single magnetically biased patterned first magnetoresistive (MR) layer 16''' in place of the aggregate of: (1) the magnetically biased etched patterned first magnetoresistive (MR) layer 16''; and (2) the pair of magnetically biased patterned first magnetoresistive (MR) filler layers 22a' and 22b'.

In a first instance, the anti-parallel exchange biased dual stripe magnetoresistive (APEX-DSMR) sensor element whose schematic cross-sectional diagram is illustrated in FIG. 7 provides advantage in comparison with fabricating the anti-parallel exchange biased dual stripe magnetoresistive (APEX-DSMR) sensor element whose schematic cross-sectional diagram is illustrated in FIG. 6 since both the magnetically biased patterned first magnetic exchange bias layers 24a' and 24b' and the magnetically biased patterned second magnetic exchange bias layers 36a' and 36b' may be formed of the same anti-ferromagnetic magnetic biasing material, while exhibiting distinct blocking temperatures. Such provides manufacturing efficiency, albeit at a sacrifice in magnetic exchange bias between the pair of magnetically biased patterned first magnetic exchange bias layers 24a' and 24b' and the magnetically biased patterned first magnetoresistive (MR) layer 16''', since in absence of the pair of patterned first magnetoresistive (MR) filler layers 22a and 22b there remains only the magnetically biased patterned first magnetoresistive (MR) layer 16''' which since it is optimized for enhanced magnetoresistive (MR) resistivity sensitivity is not otherwise optimized to provide enhanced magnetic exchange bias of the pair of magnetically biased patterned first magnetic exchange bias layers 24a' and 24b' when formed upon the magnetically biased patterned first magnetoresistive (MR) layer 16'''.

As an alternative advantage, under circumstances with respect to the anti-parallel exchange biased dual stripe magnetoresistive (APEX-DSMR) sensor element whose schematic cross-sectional diagram is illustrated in FIG. 7 where the pair of magnetically biased patterned first magnetic exchange bias layers 24a' and 24b' is formed of a first anti-ferromagnetic exchange bias material and the pair of magnetically biased patterned second magnetic exchange bias layers 36a'and 36b' is formed of second anti-ferromagnetic magnetic exchange bias material, and the second anti-ferromagnetic exchange bias material inherently has a lower blocking temperature than the first anti-ferromagnetic exchange bias material, there may be further enhanced a disparity of the blocking temperatures of the pair of magnetically biased patterned first magnetic exchange bias layers 24a' and 24b' and the pair of magnetically biased patterned second magnetic exchange bias layers 36a' and 36b'.

EXAMPLES

In order to illustrate the value and operation of the present invention, there were obtained two substrates of length about 4 inches and width about 4 inches, as typically employed within magnetic head fabrication. Formed over one of the substrates was a magnetoresistive (MR) sensor element structure comprising: (1) a patterned seed layer of a nickel-iron-chromium alloy of nickel:iron:chromium weight ratio about 48:12:40 and of thickness about 40 angstroms and length about 4.0; (2) a patterned magnetoresistive (MR) layer formed aligned upon the patterned seed layer from a nickel-iron (80:20, w:w) permalloy alloy magnetoresistive (MR) material to a thickness of about 80 angstroms; (3) a pair of patterned magnetic exchange bias layers formed upon a pair of opposite ends of the patterned magnetoresistive (MR) layer from an iridium-manganese anti-ferromagnetic magnetic exchange biasing material of iridium-manganese weight ratio about 20:80 at a thickness of about 75 angstroms to define a trackwidth of the patterned magnetoresistive (MR) layer of about 1.0 microns; and (4) a pair of patterned conductor lead layers formed aligned upon the pair of patterned magnetic exchange bias layers of a tantalum/gold/tantalum laminate material formed to a thickness of about 600 angstroms.

Over the second substrate was formed a magnetoresistive (MR) sensor element structure otherwise equivalent to the magnetoresistive (MR) sensor element structure as was formed over the first substrate, but wherein there was not employed the seed layer.

Each of the magnetoresistive sensor element structures was then thermally annealed at a temperature of about 280 degrees centigrade in an extrinsic magnetic bias field of about 2000 oersteds aligned along the length (i.e. long axis) of the patterned magnetoresistive (MR) layer to provide proper alignment of the pair of magnetic exchange biasing layers and the pair of patterned magnetoresistive (MR) layers.

There was then measured for each of the magnetoresistive (MR) sensor element structures a variation of magnetic exchange bias field as a function of temperature while employing methods as are conventional in the art of magnetoresistive (MR) sensor element fabrication. The results are reported within the graph of FIG. 8, wherein the curve corresponding with reference numeral 82 corresponds with the measured magnetic exchange bias fields of the magnetoresistive (MR) sensor element structure fabricated employing the nickel-iron-chromium seed layer and the curve corresponding with reference numeral 84 corresponds with measured magnetic exchange bias fields of the magnetoresistive (MR) sensor element structure fabricated absent the seed layer.

Figure 8:
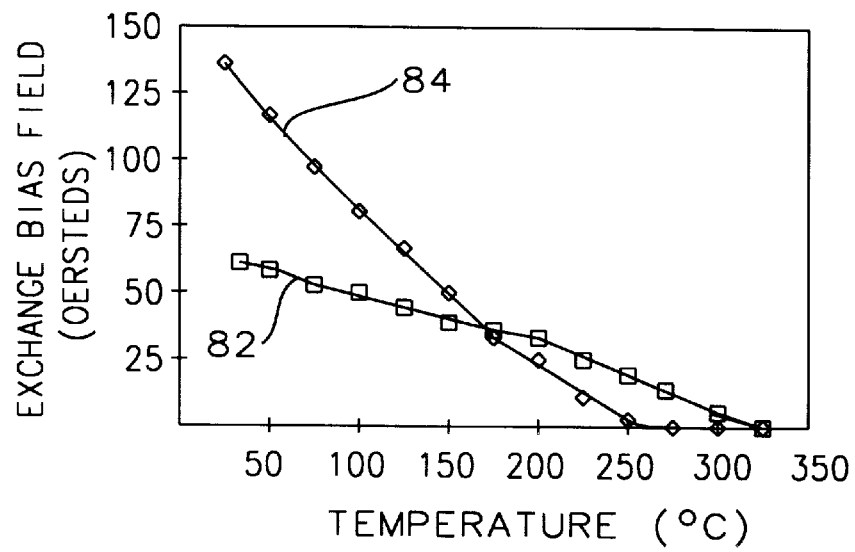
FIG. 8 shows a graph of Exchange Bias Field versus Temperature for a pair of magnetoresistive (MR) sensor elements in accord with a pair of examples which illustrates the value of the present invention.

As is illustrated with the graph of FIG. 8, at a normal operating temperature of the magnetoresistive (MR) sensor element structures there is observed a significant difference in magnetic exchange bias field between the patterned magnetic exchange bias layers and the patterned magnetoresistive (MR) layers within the magnetoresistive (MR) sensor elements. In that regard, there is observed a significantly lower magnetic exchange bias field for the magnetoresistive (MR) sensor element structure fabricated employing the seed layer.

As a further illustration of the value of the present invention, there was formed an additional pair of magnetoresistive (MR) sensor element structures otherwise equivalent to the first pair of magnetoresistive (MR) sensor element structures, but wherein instead of employing the pair of patterned magnetic exchange bias layers formed of the iridium-manganese alloy at the thickness of about 75 angstroms there was instead employed a pair of patterned magnetic exchange bias layers formed of a nickel-manganese antiferromagnetic alloy of nickel:manganese weight ratio about 50:50 at a thickness of about 200 angstroms.

Figure 9:
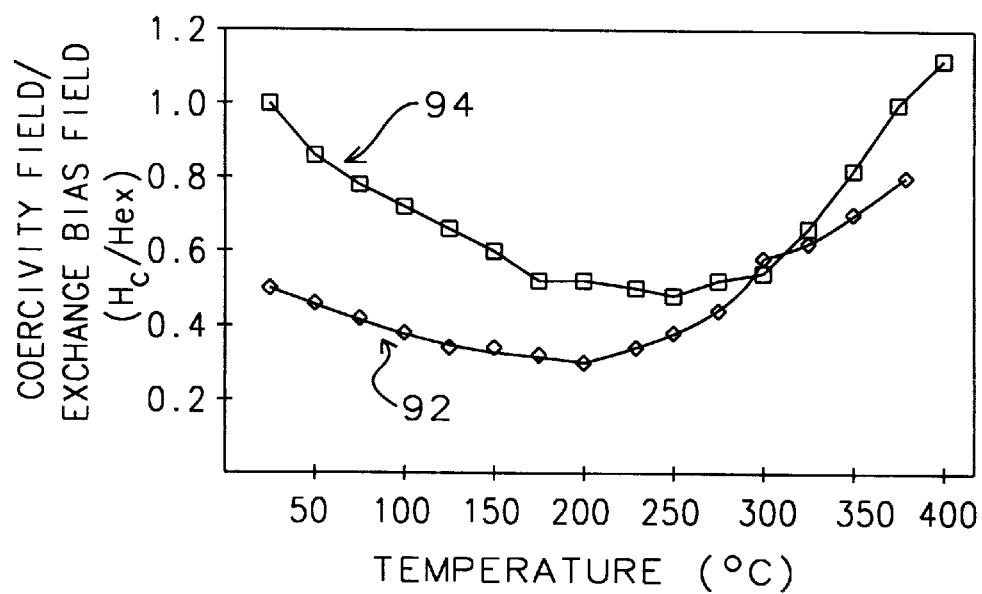
FIG. 9 shows a graph of Coercivity Field normalized to Exchange Bias Field versus Temperature for a pair of magnetoresistive (MR) sensor elements in accord with another pair of examples which illustrates the value of the present invention.

There was also measured for this second pair of magnetoresistive (MR) sensor element structures a corresponding pair of magnetic exchange bias fields as a function of temperature and a corresponding pair of coercivity fields as a function of temperature. Shown in FIG. 9 is a graph of coercivity field normalized to magnetic exchange bias field as a function of temperature for each of these two additional magnetoresistive (MR) sensor elements. The curve corresponding with reference numeral 94 corresponds with the magnetoresistive (MR) sensor element structure fabricated employing the patterned magnetoresistive (MR) layer formed upon the seed layer which provides the enhanced magnetoresistive (MR) resistivity sensitivity of the patterned magnetoresistive (MR) layer. The curve corresponding with reference numeral 92 corresponds with the magnetoresistive (MR) sensor element structure fabricated in absence of a seed layer which provides enhanced magnetoresistive (MR) resistivity sensitivity to the magnetoresistive (MR) sensor element.

As is illustrated within the graph of FIG. 9, there is shown a significant disparity of normalized coercivity as a function of temperature for the two magnetoresistive (MR) sensor element structures, with the magnetoresistive sensor element fabrication formed with the seed layer having the higher normalized coercivity. Thus, it is implied from analysis of the data contained within the graph of FIG. 9 that blocking temperature differential as disclosed within the Description of the Preferred Embodiments is actually realized.

As is understood by a person skilled in the art, the preferred embodiments and examples of the present invention are illustrative of the present invention rather than limiting of the present invention. Revisions and modifications may be made to methods, materials, structures and dimensions through which is provided a magnetoresistive (MR) sensor element or a dual stripe magnetoresistive (DSMR) sensor element in accord with the preferred embodiments and examples of the present invention while still providing a magnetoresistive (MR) sensor element or a dual stripe magnetoresistive (DSMR) sensor element in accord with the present invention, as defined by the accompanying claims.

What is claimed is:

1. A method for forming a dual stripe magnetolesistive (DSMR) sensor element having antiparallel longitudinal exchange biasing comprising:

providing a substrate;

forming over the substrate a first magnetoresistive (MR) layer, wherein said first magnetoresistive (MR) layer comprises:

a bulk layer formed of a first magnetoresistive (MR) material optimized to provide an enhanced magnetoresistive (MR) resistivity sensitivity of the first magnetoresistive (MR) layer; and a surface layer formed of a second magnetoresistive (MR) material optimized to provide an enhanced longitudinal magnetic exchange bias when forming a longitudinal magnetic exchange bias layer upon the surface layer of the said first magnetoresistive (MR) layer;

forming upon said surface layer of said first magnetoresistive (MR) layer an antiferromagnetic longitudinal exchange bias layer;

forming on said antiferromagnetic longitudinal exchange bias layer on said first magnetoresistive (MR) layer a conducting lead layer;

forming over said conducting lead layer and over the portion of said bulk magnetoresistive (MR) layer of said first magnetoresistive (MR) layer not covered by said conducting lead layer a blanket dielectric spacer layer;

forming over said blanket dielectric spacer layer a second magnetoresistive (MR) layer, wherein said second magnetoresistive (MR) layer comprises:

a bulk layer formed of a third magnetoresistive (MR) material optimized to provide an enhanced magnetoresistive (MR) resistivity sensitivity of the second magnetoresistive (MR) layer; and a surface layer upon said third magnetoresistive (MR) material formed of a fourth magnetoresistive (MR) material optimized to provide an enhanced longitudinal magnetic exchange bias when forming a longitudinal magnetic exchange bias layer upon said second surface layer forming upon said surface layer of said second magnetoresistive (MR) layer an antiferromagnetic longitudinal exchange bias layer;

forming over said antiferromagnetic longitudinal exchange bias layer on said second magnetoresistive (MR) layer a conducting lead layer;

magnetizing said antiferromagnetic longitudinal exchange bias layer, said bulk magnetoresistive (MR) layer and said surface magnetoresistive (MR) layer of said first magnetoresistive (MR) layer in a longitudinally directed first extrinsic magnetic field at a first annealing temperature;

magnetizing said antiferromagnetic longitudinal exchange bias layer, said bulk magnetoresistive (MR) layer and said surface magnetoresistive (MR) layer of said second magnetoresistive (MR) layer in a second extrinsic magnetic field in a direction opposite to the first extrinsic magnetic field and at a second annealing temperature.

2. The method of claim 1 wherein the bulk layers of both the first and second magnetoresistive (MR) layers are each optimized to provide the enhanced magnetoresistive (MR) resistive sensitivity of the first and second magnetoresistive (MR) layers respectively, by forming each of said bulk layers upon a seed layer which enhances the magnetoresistive (MR) resistivity sensitivity of said bulk layers.

3. The method of claim 1 wherein the surface layer of the first magnetoresistive (MR) layer is optimized to provide the enhanced magnetic exchange bias when forming the magnetic exchange bias layer upon said surface layer by forming said surface layer with a different crystallographic structure than the bulk layer of the first magnetoresistive (MR) layer.

4. The method of claim 1 wherein the bulk layer and the surface layer of the first magnetoresistive (MR) layer and the bulk layer and the surface layer of the second magnetoresistive layer are each formed from a mgnetoresistive (MR) material selected from the group consisting of nickel-iron permalloy alloy magnetoresistive (MR) materials, higher order alloys incorporating nickel-iron permalloy alloy magnetoresistive (MR) materials, other nickel magnetoresistive (MR) materials, other iron magnetoresistive (MR) materials, cobalt magnetoresistive (MR) materials, alloys thereof and laminates thereof.

5. The method of claim 1 wherein the first and second magnetic exchange bias layers are each formed of an antiferromagnetic exchange bias material selected from the group consisting of iron-manganese alloy materials, nickel-manganese alloy materials, iridium-manganese alloy materials, platinum-manganese alloy materials, platinum-palladium-manganese alloy materials, nickel-chromium-manganese alloy materials, ruthenium-rhodium-manganese alloy materials, platinum-chromiummanganese alloy materials and higher order alloys thereof.

6. A dual stripe magnetoresistive (DSMR) sensor element having antiparallel longitudinal exchange biasing comprising:
   a substrate;
   a first magnetoresistive (MR) layer separated from a second magnetoresistive (MR) layer by a spacer layer, where each of the first magnetoresistive (MR) layer, the second magnetoresistive (MR) layer and the spacer layer is formed over the substrate, and wherein at least one magnetoresistive (MR) layer selected from the first magnetoresistive (MR) layer and the second magnetoresistive (MR) layer comprises:
       a bulk layer formed of a first magnetoresistive (MR) material optimized to provide an enhanced magnetoresistive (MR) resistivity sensitivity of the magnetoresistive (MR) layer; and
       a surface layer formed of a second magnetoresistive (MR) material optimized to provide an enhanced magnetic exchange bias when forming a magnetic exchange bias layer upon the surface layer of the magnetoresistive (MR) layer; and
   an antiferromagnetic longitudinal exchange bias layer formed upon the surface layer of each magnetoresistive (MR) layer, wherein each of said antiferromagnetic longitudinal exchange bias layers and the magnetoresistive (MR) layer on which it is formed, is magnetized in a longitudinal direction, antiparallel to the other of said antiferromagnetic longitudinal exchange bias layers and the magnetoresistive (MR) layer on which it is formed.

7. The dual stripe magnetoresistive (MR) sensor element of claim 6 further comprising a first seed layer formed over the substrate and a second seed layer formed over the substrate, where the first magnetoresistive (MR) layer is formed upon the first seed layer and the second magnetoresistive (MR) layer is formed upon the second seed layer.

8. The dual stripe magnetoresistive (DSMR) sensor element of claim 6 wherein:
   both the bulk layer of the magnetoresistive (MR) layer and the surface layer of the magnetoresistive (MR) layer are formed of a single magnetoresistive (MR) material;
   the bulk layer of the magnetoresistive (MR) layer is formed of a single crystal of the single magnetoresistive (MR) material; and
   the surface layer of the magnetoresistive (MR) layer is formed of a polycrystal of the single magnetoresistive (MR) material.

9. A magnetic data storage enclosure having fabricated therein a dual stripe magnetoresistive (DSMR) sensor element in accord with claim 6.

10. The method of claim 1 wherein:
   both the bulk layer and surface layer of each magnetoresistive (MR) layer are formed of a single magnetoresistive (MR) material; and
   the bulk layer of each magnetoresistive (MR) layers is formed of a single crystal of said single magnetoresistive (MR) material; and
   the surface layer of the first magnetoresistive (MR) layer is formed of a polycrystal of the single magnetoresistive (MR) material; and
   the surface layer of the second magnetoresistive (MR) layer is formed of a single crystal of said single magnetoresistive (MR) material; and
   the second extrinsic magnetic field is applied first, at a second annealing temperature and the first extrinsic magnetic field is applied after the application of the second extrinsic magnetic field at a first annealing temperature and the second annealing temperature is a higher temperature than the first annealing temperature.

11. The method of claim 10 wherein the single (MR) material is selected from the group consisting of nickel-iron permalloy alloy magnetoresistive (MR) materials, higher order alloys incorporating nickel-iron permalloy alloy magnetoresistive (MR) materials, other nickel magnetoresistive (MR) materials, other iron magnetoresistive (MR) materials, cobalt magnetoresistive (MR) materials, alloys thereof and laminates thereof.

12. The method of claim 1 wherein:
   both the bulk layer and surface layer of each magnetoresistive (MR) layers are formed of a single magnetoresistive (MR) material; and
   the bulk layer of each magnetoresistive (MR) layers is formed of a single crystal of said single magnetoresistive (MR) material; and
   the surface layer of the second magnetoresistive (MR) layer is formed of a polycrystal of the single magnetoresistive (MR) material; and
   the surface layer of the first magnetoresistive (MR) layer is formed of a single crystal of said single magnetoresistive (MR) material; and
   the first extrinsic magnetic field is applied first, at a first annealing temperature and the second extrinsic magnetic field is applied after the first extrinsic magnetic field and at a second annealing temperature and the first annealing temperature is a higher temperature than the second annealing temperature.

13. The method of claim 12 wherein the single (MR) material is selected from the group consisting of nickel-iron permalloy alloy magnetoresistive (MR) materials, higher order alloys incorporating nickel-iron permalloy alloy magnetoresistive (MR) materials, other nickel magnetoresistive (MR) materials, other iron magnetoresistive (MR) materials, cobalt magnetoresistive (MR) materials, alloys thereof and laminates thereof.

14. The method of claim 1 wherein the surface layer of the second magnetoresistive (MR) layer is optimized to provide the enhanced magnetic exchange bias when forming the magnetic exchange bias layer upon said surface layer by forming said surface layer with a different crystallographic structure than the bulk layer of the second magnetoresistive (MR) layer.

15. The method of claim 1 wherein the bulk layer and the surface layer of the first magnetoresistive (MR) layer and the bulk layer and the surface layer of the second magnetoresistive layer are each formed from a mgnetoresistive (MR) material selected from the group consisting of nickel-iron permalloy alloy magnetoresistive (MR) materials, higher order alloys incorporating nickel-iron permalloy alloy magnetoresistive (MR) materials, other nickel magnetoresistive (MR) materials, other iron magnetoresistive (MR) materials, cobalt magnetoresistive (MR) materials, alloys thereof and laminates thereof.

* * * * *